United States Patent

Jones et al.

[11] Patent Number: 5,963,284
[45] Date of Patent: Oct. 5, 1999

[54] LCD WITH DIFFUSER HAVING DIFFUSING PARTICLES THEREIN LOCATED BETWEEN POLARIZERS

[75] Inventors: Michael R. Jones, South Lyon; John A. VanderPloeg, Highland; Matthew W. Warmuth, Ann Arbor; Laurie D. Lovshe, Canton, all of Mich.

[73] Assignee: OIS Optical Imaging Systems, Inc., Northville, Mich.

[21] Appl. No.: 09/053,039

[22] Filed: Apr. 1, 1998

[51] Int. Cl.$^6$ .................................................. G02F 1/1335
[52] U.S. Cl. .............................................................. 349/112
[58] Field of Search ........................... 349/112; 359/615, 359/707

[56] References Cited

U.S. PATENT DOCUMENTS

| | | |
|---|---|---|
| 4,088,400 | 5/1978 | Assouline et al. . |
| 4,139,261 | 2/1979 | Hilsum . |
| 4,171,874 | 10/1979 | Bigelow et al. . |
| 4,183,630 | 1/1980 | Funada et al. . |
| 4,660,936 | 4/1987 | Nosker . |
| 4,704,004 | 11/1987 | Nosher . |
| 4,729,641 | 3/1988 | Matsuoka et al. . |
| 4,883,343 | 11/1989 | Teshirogi . |
| 4,904,049 | 2/1990 | Hegg . |
| 4,915,479 | 4/1990 | Clarke . |
| 4,936,659 | 6/1990 | Anderson et al. . |
| 5,035,490 | 7/1991 | Hubby, Jr. . |
| 5,046,827 | 9/1991 | Frost et al. . |
| 5,066,108 | 11/1991 | McDonald . |
| 5,128,783 | 7/1992 | Abileah et al. . |
| 5,132,830 | 7/1992 | Fukutani et al. . |
| 5,159,478 | 10/1992 | Akiyama et al. . |
| 5,225,920 | 7/1993 | Kasazumi et al. . |
| 5,280,371 | 1/1994 | McCarthy, Jr. et al . |
| 5,292,625 | 3/1994 | McFadden et al. . |
| 5,473,454 | 12/1995 | Blanchand . |
| 5,557,433 | 9/1996 | Maruyama et al. . |
| 5,629,784 | 5/1997 | Abileah et al. . |
| 5,629,785 | 5/1997 | Valliath et al. . |
| 5,675,435 | 10/1997 | Ishii et al. . |
| 5,729,313 | 3/1998 | Mitsui . |
| 5,825,442 | 10/1998 | Yoneda et al ........................... 349/112 |

FOREIGN PATENT DOCUMENTS

| | | |
|---|---|---|
| 0179913 | 5/1986 | European Pat. Off. . |
| 0491662 | 6/1992 | European Pat. Off. . |
| 5342054 | 4/1978 | Japan . |
| 61-148430 | 7/1986 | Japan . |
| 6255624 | 3/1987 | Japan . |
| 63-159824 | 7/1988 | Japan . |
| 2118518 | 5/1990 | Japan . |
| 6-95099 | 4/1994 | Japan . |

Primary Examiner—James A. Dudek
Attorney, Agent, or Firm—Joseph A. Rhoa

[57] ABSTRACT

A liquid crystal display includes a patternable diffusing layer therein positioned between the display's substrates. The diffusing (or diffuser) layer includes a host material having a plurality of particles (e.g. substantially transparent spherical balls or spacers) provided therein in order to perform a diffusion function. The refractive index $n_p$ of the particles is different (i.e. $\Delta n$) from the refractive index $n_h$ of the host material by at least about 0.05, and $\Delta n$ is preferably from about 0.05–0.15. In certain embodiments, photoimageable color filters, with diffusing particles embedded therein, function as discrete diffusing members across the passive substrate. In other embodiments, a substantially continuous diffusing layer with a transparent host, including spherical balls embedded therein, may be provided across the passive substrate between the substrate and the color filters. Still further, the diffusing layer with transparent host material may be provided between the common electrode and black matrix members on the passive substrate.

15 Claims, 9 Drawing Sheets ably 1,100 μm. A large portion of this 1,100 μm
LCD WITH DIFFUSER HAVING DIFFUSING PARTICLES THEREIN LOCATED BETWEEN POLARIZERS This invention relates to a liquid crystal display. More particularly, this invention relates to a liquid crystal display (LCD) including a diffuser provided therein at a location between the polarizers.

BACKGROUND OF THE INVENTION

Transflective liquid crystal displays (LCDs) utilize some ambient light to illuminate active matrix pixels when operating in bright light environments (i.e. high ambient light environments). The direction of the ambient light's specular component requires diffusion or randomization to prevent mirror images off of the surroundings and to enlarge the useful illumination cone. Certain prior art transflective displays have utilized a diffusing layer disposed outside of the display's polarizers (i.e. not between the polarizers and not between the substrates). Strong depolarizing effects and large thicknesses of conventional diffusers have forced such placement outside of the substrates and outside of the polarizers.

For example, see prior art FIG. 1 which is taken from commonly owned U.S. Pat. No. 5,629,784. As illustrated, the FIG. 1 display includes from the rear forward linear polarizer 1, transparent substrate 3, discrete pixel electrodes 7, rear orientation or buffing film 9, liquid crystal (LC) layer 11, front orientation or buffing film 13, common electrode 15, front substrate 17, front linear polarizer 19, optical film 21 including facets 23, holographic diffuser 25, and finally glass sheet 27. It is noted that diffuser 25 is located on the front side of the LC layer and outside of the polarizers 1, 19, and also outside (i.e. exterior) of the display's substrates 3, 17. Liquid crystal layer 11, electrodes 7, 15, and orientation films 9, 13 are located between the substrates, and between the polarizers.

Unfortunately, prior art diffusing layers, including that of the '784 patent shown in FIG. 1 herein, suffer from at least the following problems: (i) substantial depolarization of light, (ii) image parallax, and (iii) production problems which prevent practical use between a display's substrates.

With regard to depolarization shortcomings of prior art diffusing layers, such diffusers utilize scattering of input light rays to diffuse or randomize the direction of the output light rays. Conventional scattering mechanisms can be surface roughness as disclosed in the '784 patent. Certain types of scattering effects substantially depolarize light traveling through the display. This is disadvantageous, in that proper polarization is required for efficient LCD operation, in view of the typically utilized front and rear linear polarizers. Thus, each of volume diffusers, holographic diffusers, and reflective diffusers provide sizes of scatter which are on the order of a wavelength of light or smaller, and can create an undesirable depolarizing effect.

Prior art LCD diffusing systems also create parallax problems. A light diffuser or diffusing layer on the outside of a display's substrates, or on the outside of a display's polarizers, creates a detrimental effect called image parallax or pixel crosstalk. Prior art FIG. 2 illustrates the cause of such image parallax or pixel crosstalk in an LCD. Shown in FIG. 2 are diffuser 37, 25, incident light ray 31, pixel aperture 33 having a size or width "w", and pixel acceptance cone angle 35. The direction of incident light rays 31 striking diffuser screen 37 is randomized which increases the useful illumination cone 35 and prevents mirror images of the surrounding environment. The separation "d" of diffusing layer 37, 25 from pixel aperture(s) 33 allows some light 39 to cross over and exit through adjacent pixels thereby blurring the resulting image. Image parallax worsens as the separation "d" between diffusing layer 37 and pixel aperture (s) 33 increases because more light 39 can make its way into adjacent or distant pixels. Pixel apertures 33 are typically defined proximate the liquid crystal (LC) layer between or at the pixel electrodes. Thus, it would be desirable to have the diffuser as close to the LC layer as possible.

In furtherance of the above, prior art FIG. 3 illustrates a conventional transflective LCD configuration. The distance "d" between diffuser 37, 25 and pixel aperture(s) 33 is approximately 1,100 μm. A large portion of this 1,100 μm distance "d" is defined by the thickness of glass substrate 17. This large separation "d" creates substantial image parallax or pixel crosstalk due to the large distance that rays 39 can travel laterally from their correct or originating pixel. The strong depolarizing effect and large thickness of conventional diffusers 37, 25 forces their placement as illustrated in FIG. 3 on the outside of the display's substrates, and on the outside of the display's polarizers.

Prior art mass production methods of conventional diffusers are also not compatible with placing known diffusers between glass substrates of a display. For example, mass production of holographic diffusers 25 involves a film embossing process. The manufacturing of conventional diffusers requires the roughening of surfaces by physical (e.g. sanding) or chemical (e.g. etching) processes. These methods would not be efficiently utilized in providing a diffuser between either opposing polarizers or substrates of an LCD.

It is apparent from the above that there exists a long felt need in the art for a liquid crystal display (e.g. normally white, normally black, active, TN, STN, etc.) with a diffuser layer(s) provided so as to (i) reduce image parallax or pixel crosstalk, (ii) minimize depolarizing effects, and/or (iii) be manufacturable in mass production by way of a method so as to be efficiently placeable in between substrates or polarizers of a display without undue cost or sacrificing of yields. It is a purpose of this invention to satisfy the above-described needs in the art.

This invention will now be described with respect to certain embodiments thereof, accompanied by certain illustrations.

SUMMARY OF THE INVENTION

Generally speaking, this invention fulfills the above-described needs in the art by providing an LCD comprising:

first and second substantially transparent substrates;

a liquid crystal layer disposed between said first and second substrates;

a light diffuser layer disposed between said liquid crystal layer and said second substrate, wherein said light diffuser layer includes a photo-imageable host material portion that is substantially transparent to at least one visible wavelength of light and a plurality of diffusing particles embedded in the host material portion; and the host material having a refractive index of $n_h$ and the diffusing particles having a refractive index of $n_p$, and wherein Δn is greater than or equal to about 0.05, where $\Delta n = n_p - n_h$.

This invention further fulfills the above-described needs in the art by providing a method of making an LCD, the method comprising the steps of:

providing first and second substantially transparent substrates;

providing first and second polarizers;

spin-coating a diffusing material onto the second substrate, the diffusing material including a host material which is substantially transparent to at least one wavelength of visible light and a plurality of diffusing particles embedded therein;

sandwiching a liquid crystal layer between the first and second substrates so that the diffusing material is located at a point between the second substrate and the liquid crystal layer whereby the diffusing material is positioned between the substrates; and locating the first and second polarizers so that the resulting display includes the first and second substrates both located between the first and second polarizers.

This invention will now be described with respect to certain embodiments thereof.

IN THE DRAWINGS

Figure 11:
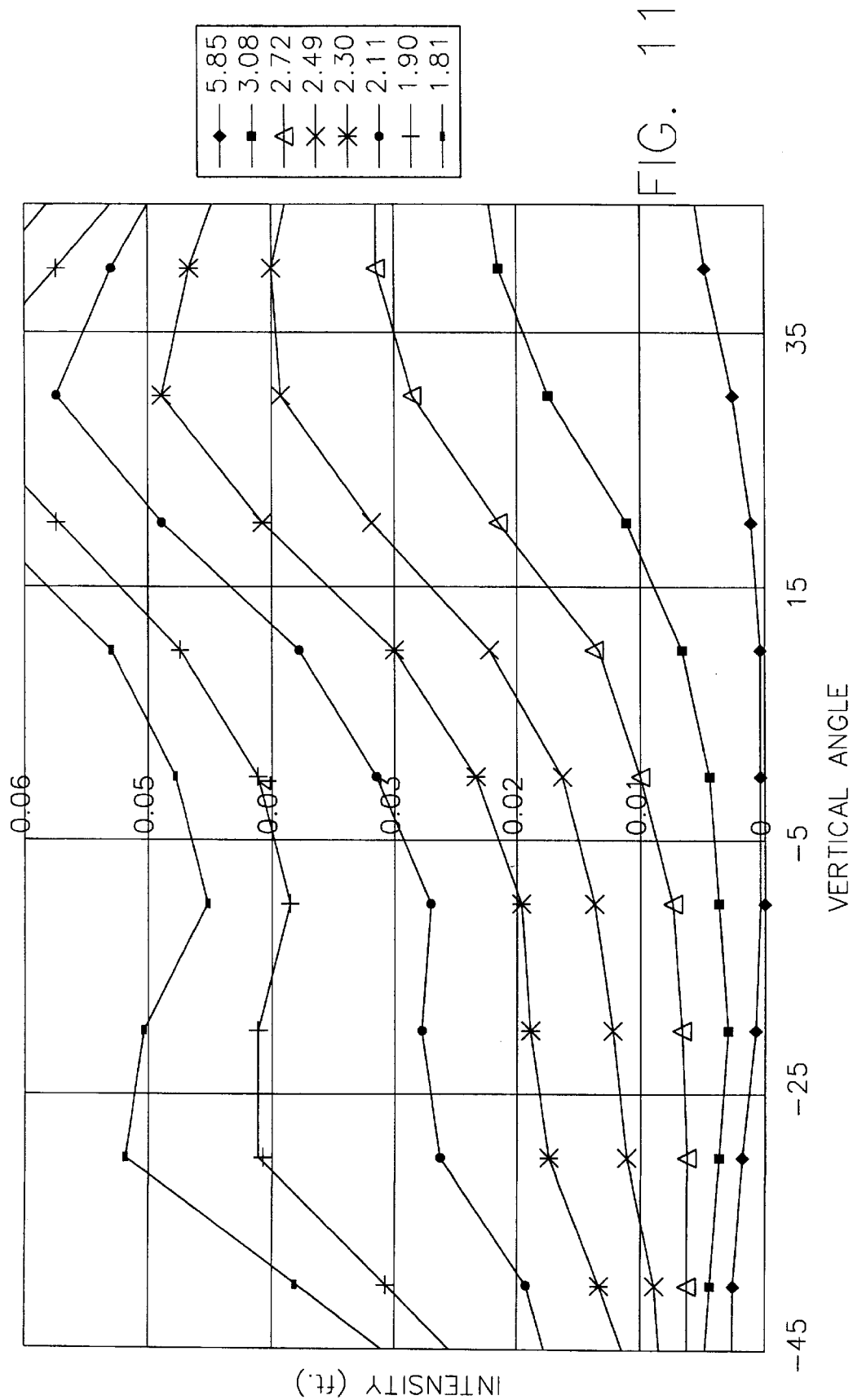

FIG. 11 is an intensity (fL) versus vertical viewing angle graph of a display according to an embodiment of this invention, illustrating improved gray scale linearity. The display configuration of FIG. 11 utilized a Fuji Red Color Mosaic™ color filter including spherical diffusing beads therein as the diffusing layer on the viewer side and inside of the polarizers, with the liquid crystal layer being approximately 4.75 $\mu$m thick and the backlight being substantially collimated.

Figure 10:
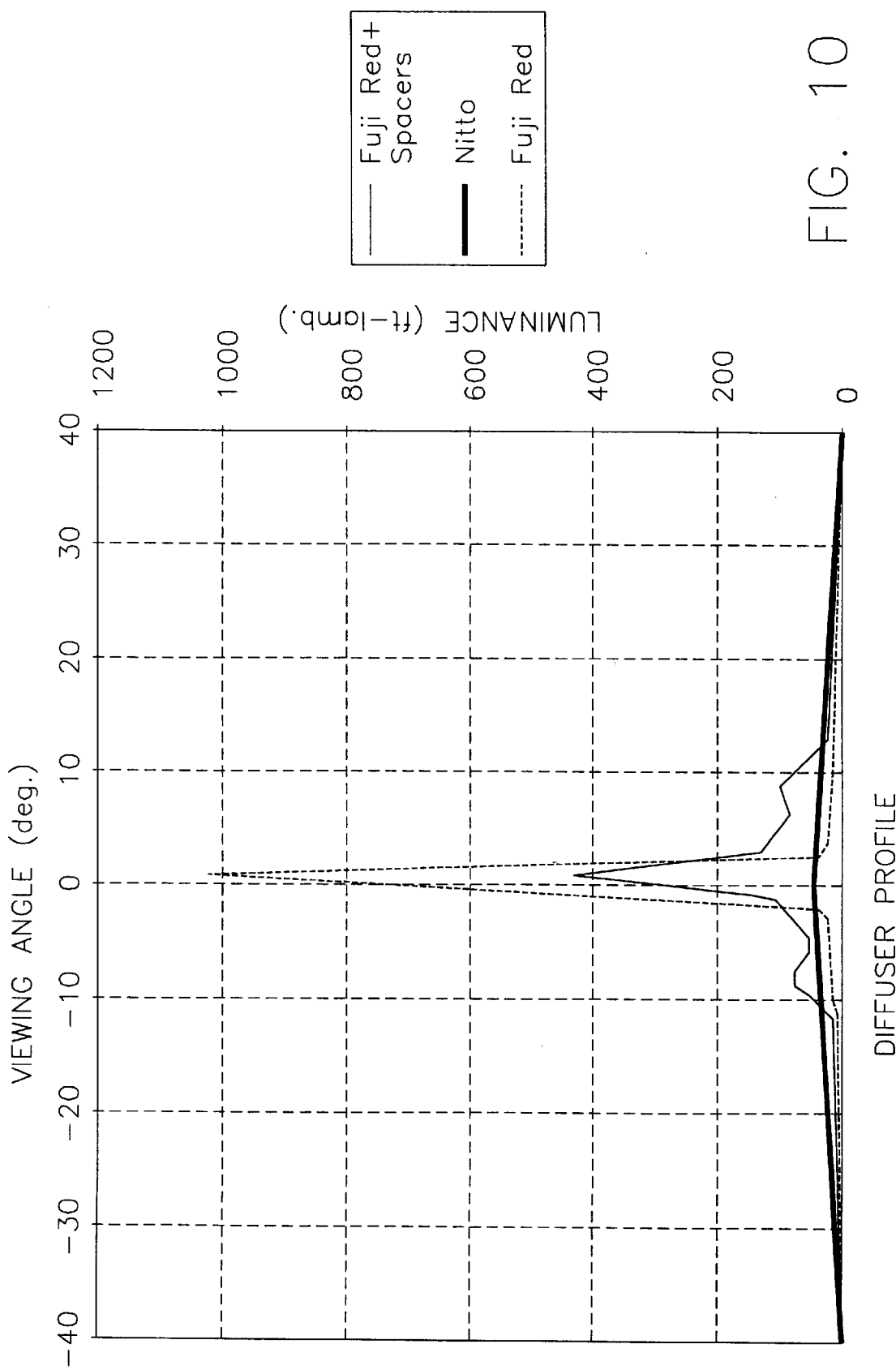
FIG. 10 is a graph of the same data as in FIG. 9, but the luminance scale is plotted on a linear scale in fL, with FIG. 10 showing that the large normal incident component of the Fuji Red Color Mosaic™ filter is diffused or spread into off normal angles by the spherical beads in the spacer inclusive embodiment.
Figure 12:
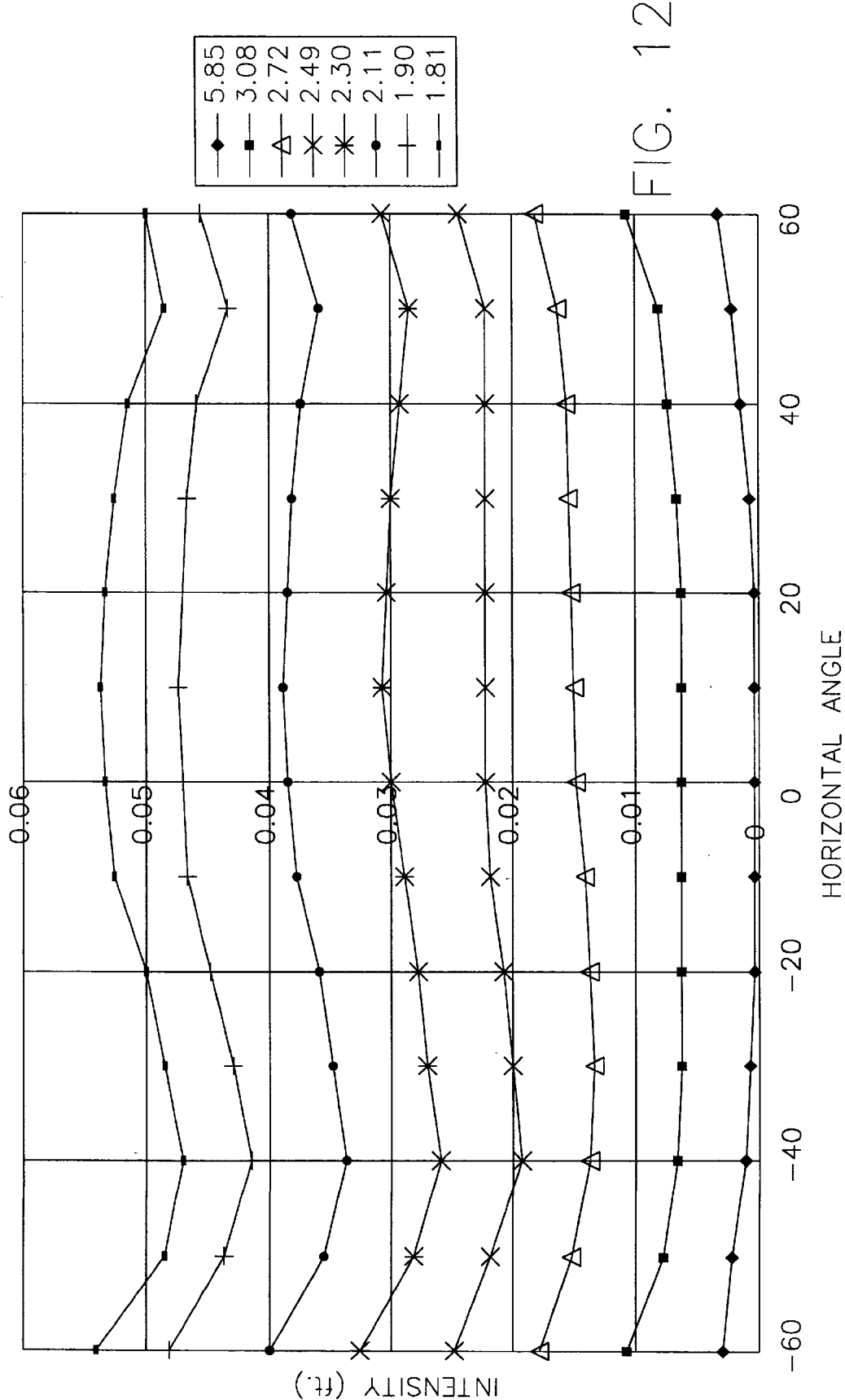

FIG. 12 is an intensity (fL) versus horizontal viewing angle graph of the display of FIG. 10, with the difference between FIG. 10 and FIG. 11 being that FIG. 11 shows performance at different horizontal viewing angles along the +10° to +15° vertical viewing angle(s).

Figure 13:
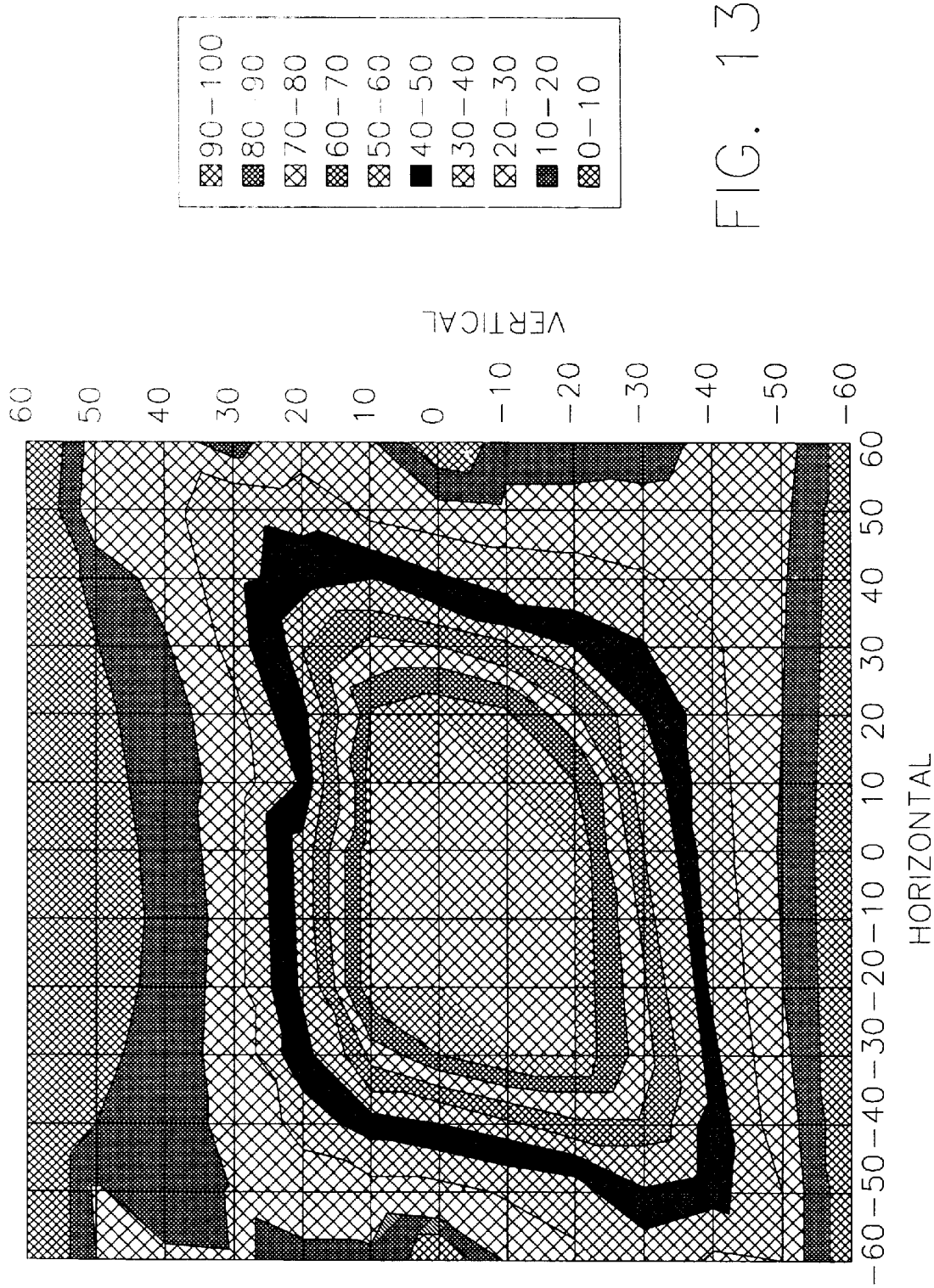

FIG. 13 is a white light contrast ratio plot of the normally white display of FIGS. 11–12, when approximately 5.85 volts were applied in the on-state and approximately 0.47 volts in the off-state. The thickness of the light valve LC layer was about 5.20 $\mu$m.

DETAILED DESCRIPTION OF CERTAIN EMBODIMENTS OF THIS INVENTION

Referring now more particularly to the accompanying drawings in which like reference numerals indicate like parts throughout the several views.

Figure 4:
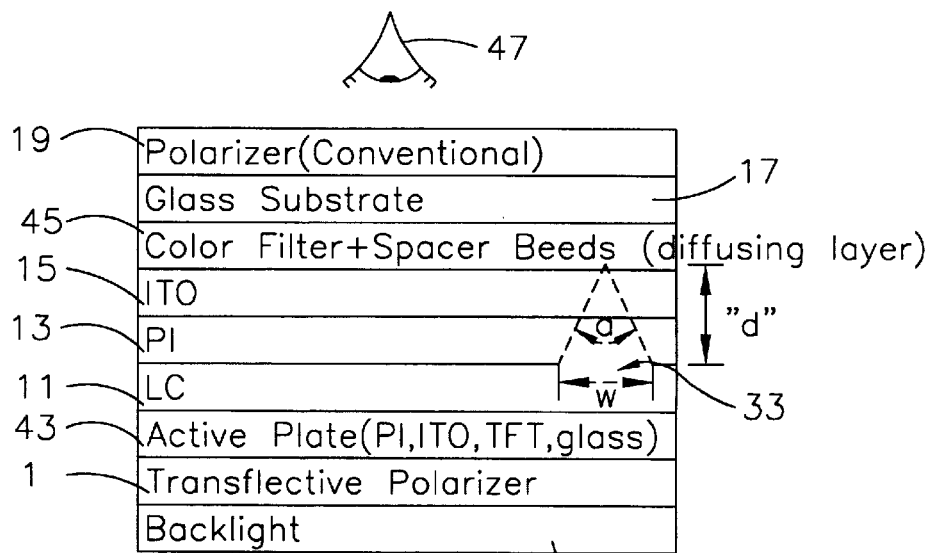
FIG. 4 is a side cross-sectional view of a liquid crystal display according to an embodiment of this invention, wherein the diffusing layer is formed by color filters in combination with spacer beads provided therein, and wherein the diffuser(s) is positioned between the opposing substrates of the display.

FIG. 4 is side cross-sectional view of layers of a transflective active matrix liquid crystal display (AMLCD) according to an embodiment of this invention. The display includes a plurality (or an array) of pixels, each defining a pixel aperture 33 proximate the liquid crystal layer 11. The pixel aperture size "w" is defined by the size of the corresponding pixel electrode (e.g. ITO) or the size of the opening defined by the black matrix (whichever is smaller).

The FIG. 4 display includes, from the rear forward, conventional substantially collimated backlight 41, rear linear polarizer 1, active plate 43 which includes a rear substantially transparent glass substrate, an array of switching TFTs, an array of substantially transparent ITO (indium-tin-oxide) pixel electrodes, and a polyimide (PI) orientation layer, twisted nematic (TN) liquid crystal (LC) layer 11, front polyimide orientation film 13, front common conductive electrode 15 (e.g. ITO), a diffusing portion 45 which in each pixel is made up of a photoimageable color filter having diffusing spacer beads embedded therein (an array of color filter diffusing members 45), front substantially transparent glass substrate 17, and finally front linear polarizer 19. All embodiments of this invention may be utilized in conjunction with backlit transmissive displays, backlit transflective displays, and reflective displays.

The FIG. 4 display is viewed by viewer 47. Light transmitted or emitted from backlight 41 makes its way through rear polarizer 1 and is polarized thereby, then it goes through active plate 43. Thereafter, the polarized light is twisted by twisted nematic liquid crystal layer 11 (when LC is in the off-state or in a semi-driven state), and thereafter the light makes its way through each of polyimide front orientation layer 13, and front substantially transparent common electrode 15. The light is then diffused by color filters 45 which also function as diffusing members. In the FIG. 4 embodiment when each, or most of, color filter in the LCD function as both filters and diffusers, the layer 45 is substantially transparent to some visible light (e.g. red) and substantially non-transparent to other visible wavelengths (e.g. blue). After being diffused, the rays proceed through substrate 17, and finally reach front polarizer 19. Depending upon the voltage applied in each pixel to liquid crystal layer 11, a particular amount of light from each pixel makes its way through front polarizer 19 thereby displaying an image to viewer 47. The amount of voltage applied to LC layer 11 dictates the degree to which the light polarization angle is twisted as the light proceeds through the LC layer and the analyzer, and thus the amount of light which reaches viewer 47.

Figure 1:
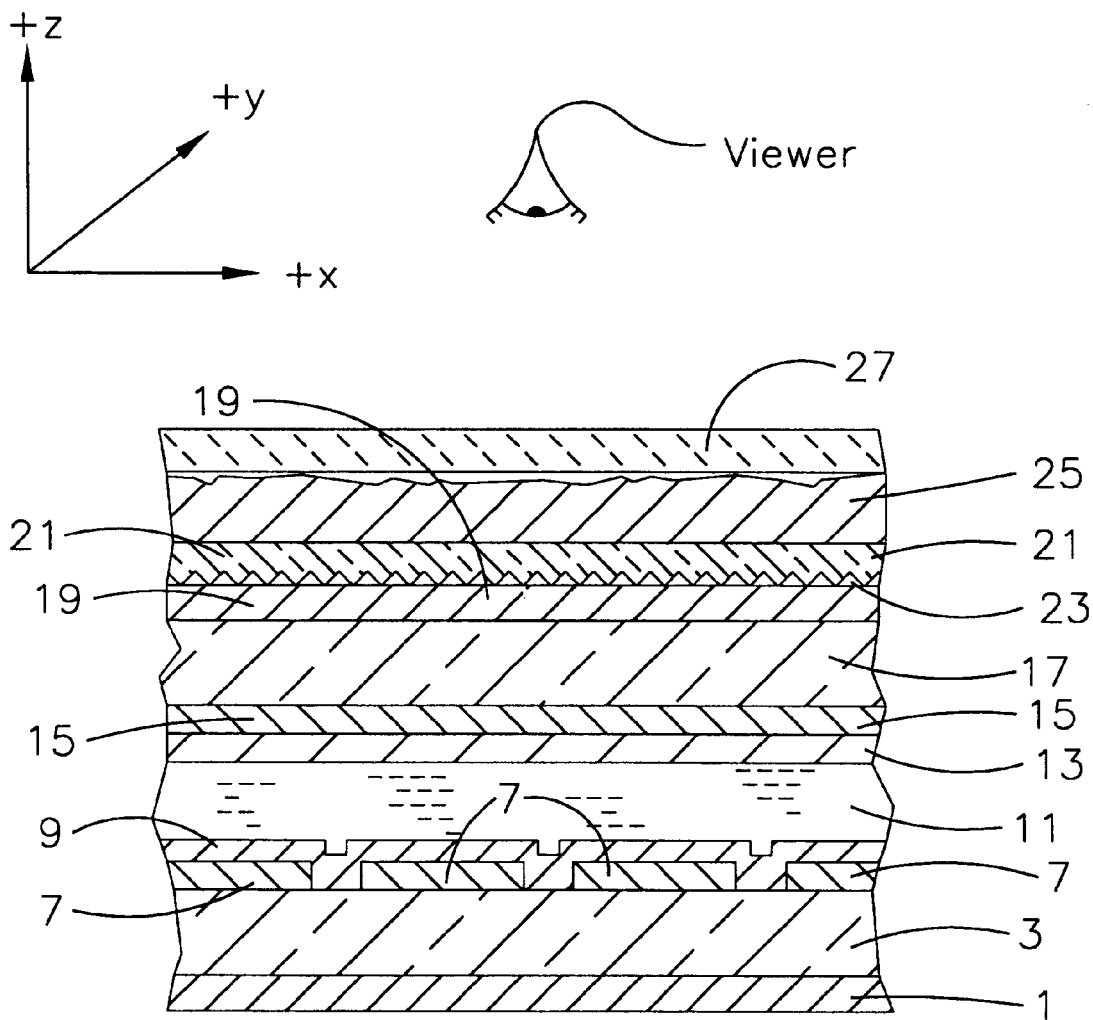
FIG. 1 is a side cross-sectional view of a conventional liquid crystal display with a diffuser outside of the substrates.
Figure 2:
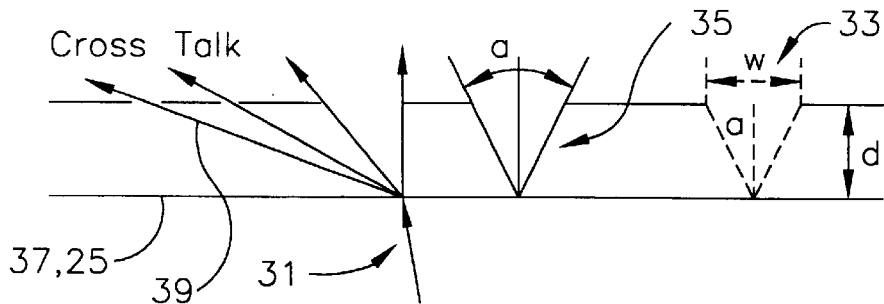
FIG. 2 is a schematic diagram illustrating a diffuser and corresponding pixel aperture, showing the cause of image parallax or pixel crosstalk.
Figure 3:
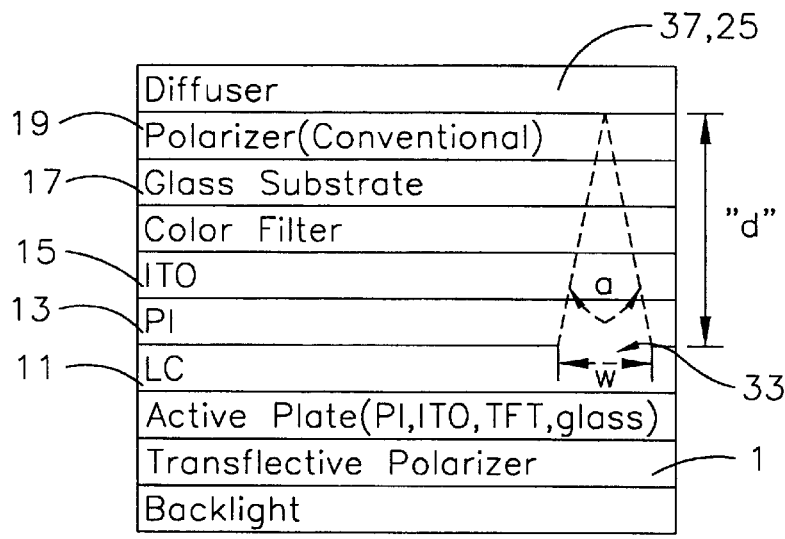
FIG. 3 is a side cross-sectional view of a conventional LCD where the diffuser is located outside of the polarizers, and outside of the substrates.

As can be seen, distance "d" between pixel aperture 33 and diffusing member(s) 45 in the FIG. 4 display, is much less than the distance "d" between these two items in prior art FIG. 3. Thus, reduced image parallax (or pixel crosstalk) results. Still further, diffusing layer 45 is of a material which minimizes depolarizing effects, thereby allowing it to be located between the display's substrates, and also between the display's polarizers 1, 19. Low depolarizing effects of diffusers in embodiments herein is achieved because of the focusing effect performed by the substantially spherical beads or particles 51. In certain embodiments, it is important that beads 51 be substantially smooth around the periphery of each bead in order to achieve efficient focusing of light to cause diffusion. Diffusing layer(s) 45 is in close proximity to pixel apertures 33 in the display (i.e. closer than the substrate 17). Internal placement of diffusing layer 45 eliminates, or substantially reduces, image parallax effects caused by conventional diffusers.

Diffuser 45 has desirable properties such as being spin-coatable onto the display, being photoimageable or photopatternable, being thin (e.g. less than about 8 $\mu$m thick, and preferably from about 4–8 $\mu$m thick), and/or having minimal or very little depolarizing effects. Thus, the invention permits transflective LCD configurations (i) to use standard glass substrates 3, 17; (ii) diffuse light incident from the viewer side of the display; and (iii) substantially eliminate image parallax or pixel crosstalk. Implementing this invention also significantly improves gray scale linearity in a display.

It is noted that diffuser 45 need not be photoimageable in all embodiments of this invention. For example, diffuser may be patternable using any type of mask, or alternatively may not be patternable at all. However, photo-imageable patternability of the diffuser layer is preferred in certain embodiments.

The fact that diffusing layer 45 may be spin-coated (or otherwise deposited) onto a substrate results in improved efficiency in making the display. Spin-coating is compatible with other LCD production methods which results in improved yields and more efficient manufacturing. Furthermore, the fact that diffuser 45 is photoimageable (or photopatternable), enables removal of unwanted material around areas such as glue seals (this is not possible with conventional diffuser production methods). Still further, diffuser 45 has increased transmission and maintains polarization in an improved manner over prior art diffusers. By maintaining the input polarization state to a large extent (i.e. low depolarizing properties), the result is a display which has contrast ratios maintained better than via conventional diffusers, when as shown in FIG. 4 the diffuser is placed between the display substrates. Diffuser 45 reduces specular reflectance of a display while increasing the diffuse reflectance much less than conventional diffusers.

It is also noted that in certain embodiments of this invention (e.g. for reflective LCDs), the diffuser may be disposed on the substrate furthest from the viewer so that ambient light passes through the LC layer before reaching the diffuser layer 45.

Mixing the horizontal and vertical gray scale characteristics of a twisted nematic LCD creates good gray level separation and linearity. The use of a collimated backlighting in conjunction with viewer side diffuser 45 as shown in FIG. 4 improves gray scale linearity. Placing diffuser 45, which is photoimageable, between the display substrates substantially reduces or eliminates image parallax.

Figure 5:
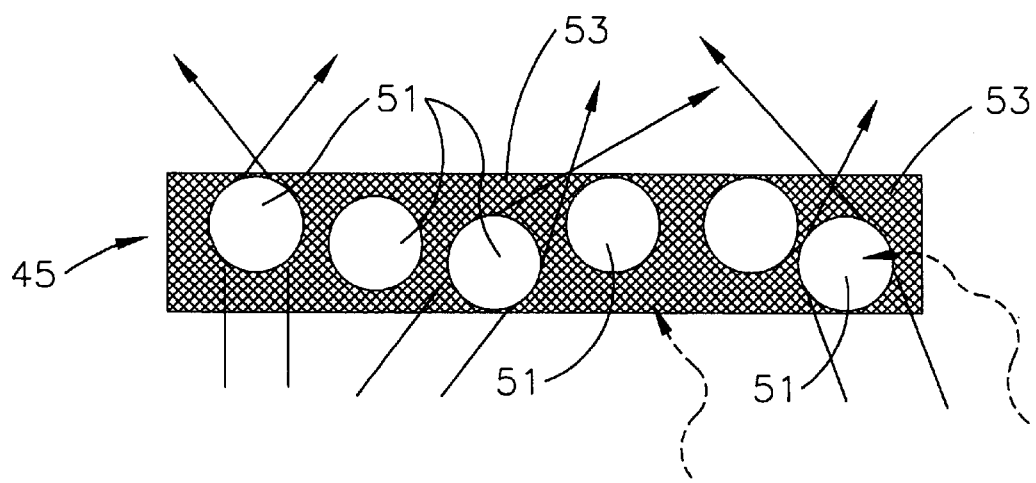
FIG. 5 is a side cross-sectional view of a diffusing layer provided herein (e.g. from any of FIGS. 4, 6, 7, or 8), the diffusing layer including substantially transparent spherical balls embedded into a host material so that the refractive index of the spherical balls is different than the refractive index of the host material, thereby resulting in a significant diffusing effect.

FIG. 5 is a side cross-sectional view of diffuser layer 45. As illustrated, diffusing layer 45 includes a plurality of discrete spherical beads 51 (or other diffusing particles) embedded in host material 53. Host material 53 is a fluid, and is compatible with known spin-coating and photoimaging and photopatterning methods. The diametric size of each spherical bead 51 (or the majority of beads 51) is from about 1 to 8 $\mu$m, preferably a diameter of from about 3–8 $\mu$m, and most preferably a diameter of from about 4–5 $\mu$m.

The refractive index of each spherical bead 51 is not equal to the refractive index of host material 53. This characteristic is important. According to certain embodiments of this invention, host material 53 has a refractive index of less than about 1.45, and preferably less than about 1.40. In certain preferred embodiments, Nissan Chemical type LR-201 material may be utilized for host material 53, having a refractive index of about 1.36 (at about a 550 nm wavelength) [available from Nissan, Japan]. Alternatively, negative resist acrylic substantially transparent Fuji Clear may also be used as the host material 53 (which acts as a negative resist). Meanwhile, the refractive index of particles or beads 51 is preferably at least about 1.5, and most preferably from about 1.5 to 1.6. Thus, the difference in refractive index (i.e. $\Delta$n) between the refractive index of host material 53 and the refractive index of particles 51 is at least about 0.05, more preferably at least about 0.1, and most preferably at least about 0.15. In certain embodiments, $\Delta$n may be within the range of from about 0.05 to 0.15. This difference in refractive index (i.e. $\Delta$n) allows the beads or particles 51 to transform the layer into a diffuser in an efficient and productive manner.

Spherical beads 51 and host material 53 have high transmission of visible light, and are thus substantially transparent (preferably at least about 90% and most preferably at least about 95%). Host material 53 can alternatively absorb certain portions of the visible spectrum to produce a color filter effect (e.g. a red color filter for example).

An example of spherical beads 51 are spacers typically used to maintain the cell gap in liquid crystal layers of liquid crystal displays (e.g. Sekisui type MicroPearl bead spacers available from Dana Enterprises, of California. Examples of host material 53 include photoimageable Fuji color mosaic filter fluids (e.g. Fuji Red™) and Fuji clear (CT) coat fluids, which are used in LCD production.

Mixing beads 51 into host material 53 is done in order to achieve a high density of beads 51 in order to produce the diffusing layer. The mixture of beads 51 and host material 53 is then spin-coated onto a substrate (e.g. as with normal color filters). The mixture is then photopatterned and cured thereby resulting in a diffuser (e.g. as an array of discrete color filters/diffusers across the substrate on the passive plate). In color filter embodiments, because color filter is typically provided in most, if not all, pixels in the display, this provides a non-continuous thin diffusing layer which has low back-scattering and low depolarization properties. Red, green, white (clear) and blue color filters (i.e. arrays)

may be provided in such a manner, each representing a diffusing layer, across the display.

Each spherical bead 51 in a host layer functions substantially as a focusing lens. Light striking the diffusing layer 45 is focused to a point in front of the diffusing layer and then diverges rapidly with increasing distance, as illustrated in FIG. 5. The focusing power of beads 51 is a function of host material 53 refractive index $n_h$, bead (or particle) 51 refractive index $n_p$, and bead radius. The focusing power (focusing power equals 1/focal length) increases with decreasing bead radius. The focusing power also increases as the index mismatch ($\Delta n = n_p - n_h$) between beads 51 and host material 53 refractive index increases. The diffusion profile or diffuser strength is a function of bead density and bead focusing power. Light diffusion effect by layer 45 increases as the focusing power of the spherical beads 51 increases and the density of the beads increases. Diffusion strength can be tuned by proper selection of bead focusing power, indices of refraction, and density.

Figure 8:
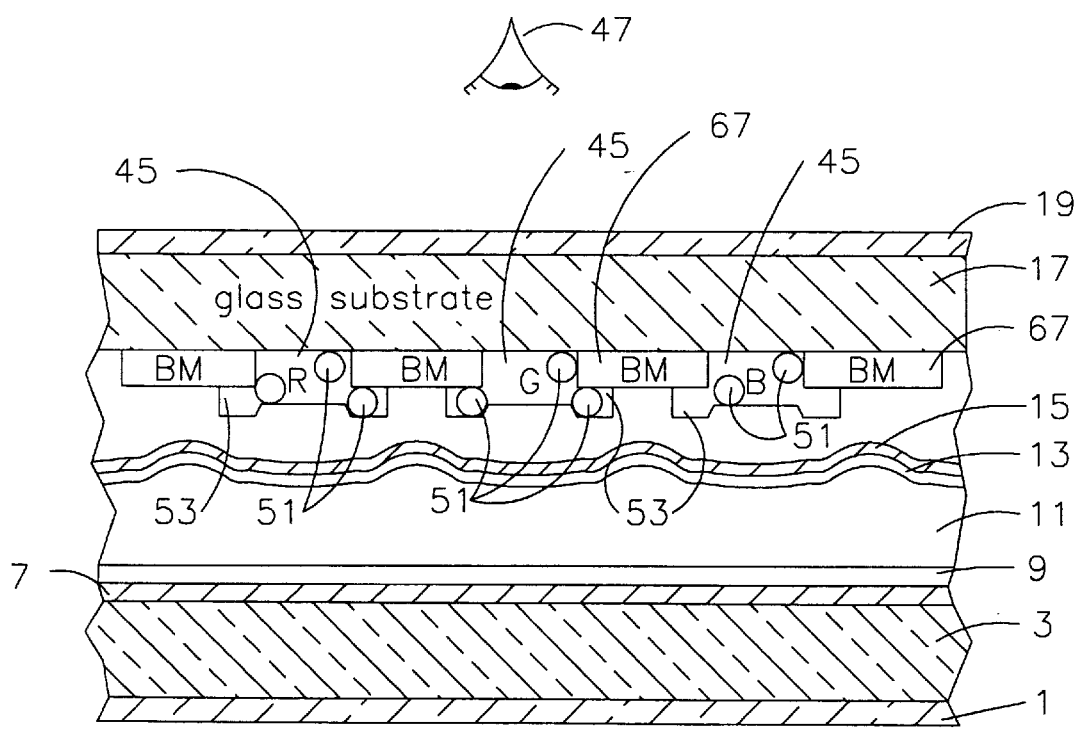
FIG. 8 is a side cross-sectional view of an LCD according to the FIG. 4 embodiment of this invention, wherein the display includes a diffusing layer formed by an array of photoimageable color filters having spacer beads therein.

FIG. 8 is a side cross-sectional view of an LCD according to the FIG. 4–5 embodiment of this invention, wherein color filters function as both color filters and diffusing layers 45. As illustrated in FIG. 8, a plurality or an array of color filters/diffusers 45 are provided on passive substrate 17 across the display. Preferably, a diffusing layer/color filter 45 is provided in each pixel, although this need not be the case in all embodiments. Red, green, and blue color filters/diffusers 45 are illustrated on passive substrate 17 in FIG. 8. White and other colored filters/diffuser may also be provided.

Figure 6:
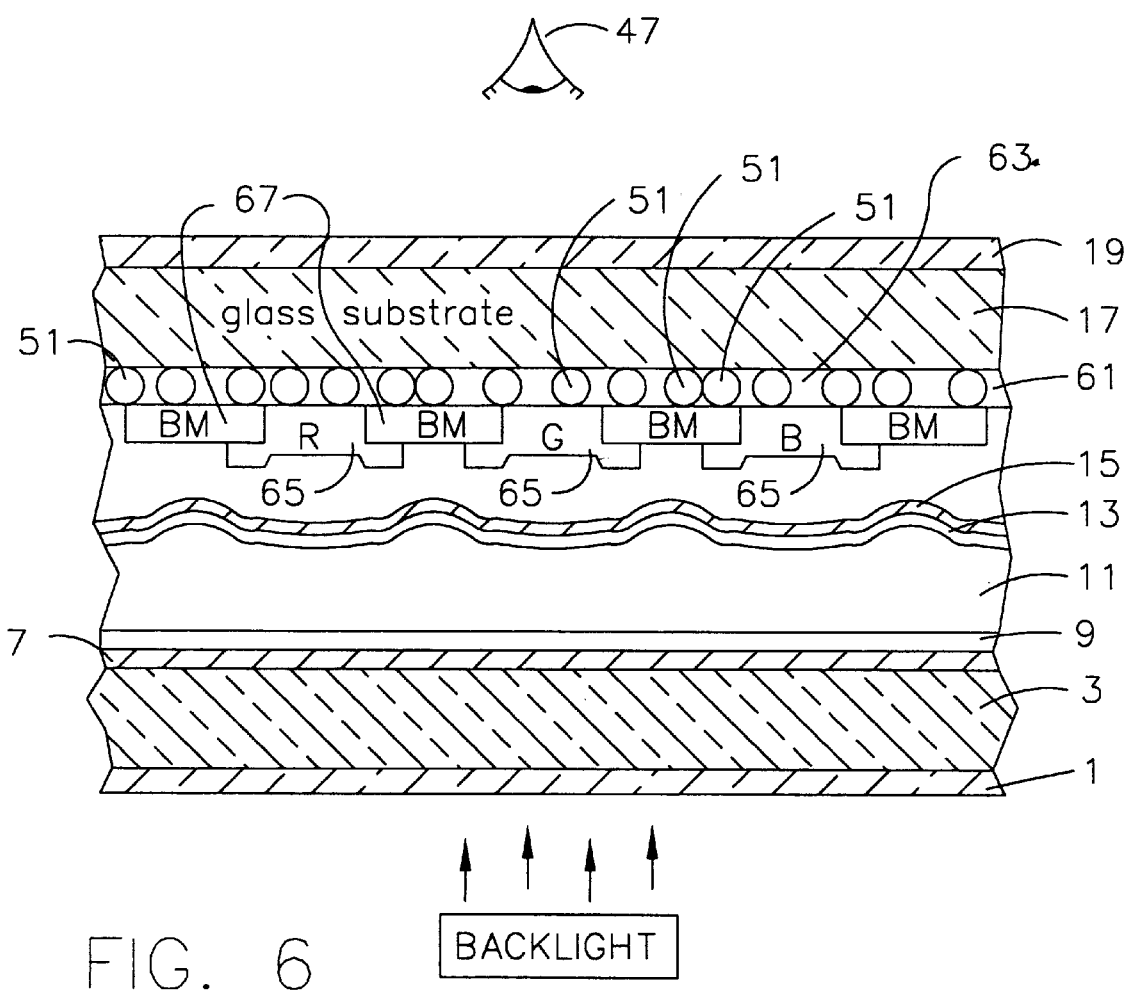
FIG. 6 is a side cross-sectional view of an LCD according to another embodiment of this invention, wherein a substantially continuous diffusing layer is formed by a combination of a photoimageable substantially transparent host material and spacer beads disposed therein, wherein the diffuser is positioned between the front or passive substrate and the color filters.

FIG. 6 is a side cross-sectional view of another embodiment of this invention, wherein the LCD includes diffusing layer 61 provided between passive substrate 17 and color filters 65. As in the previous embodiments, diffusing layer 61 includes both host material 63 (same as 53) and spheres or particles 51. Host material 63 in certain embodiments has a dielectric constant of less than about 4.5, and acts as a negative resist material. In this embodiment, diffusing layer 61 is separate and independent from color filters 65, and host material is substantially transparent to all visible light. Diffusing layer 61 is located between substrates 3 and 17, and also between polarizers 1 and 19. Specifically, diffusing layer 61 is located directly on the interior surface of passive substrate 17 between the substrate and color filters 65. Optionally, black matrix members 67 may also be provided on substrate 17 as illustrated in FIG. 6, with diffuser 61 being located between substrate 17 and black matrix members 67. Diffusing layer 61 in the FIG. 6 embodiment acts and functions as discussed above relative to FIG. 5, yet it does not act as a color filter. Exemplar host materials 61 for the FIG. 6 embodiment include photoimageable Fuji Clear™ (CT) acrylic polymer.

Figure 7:
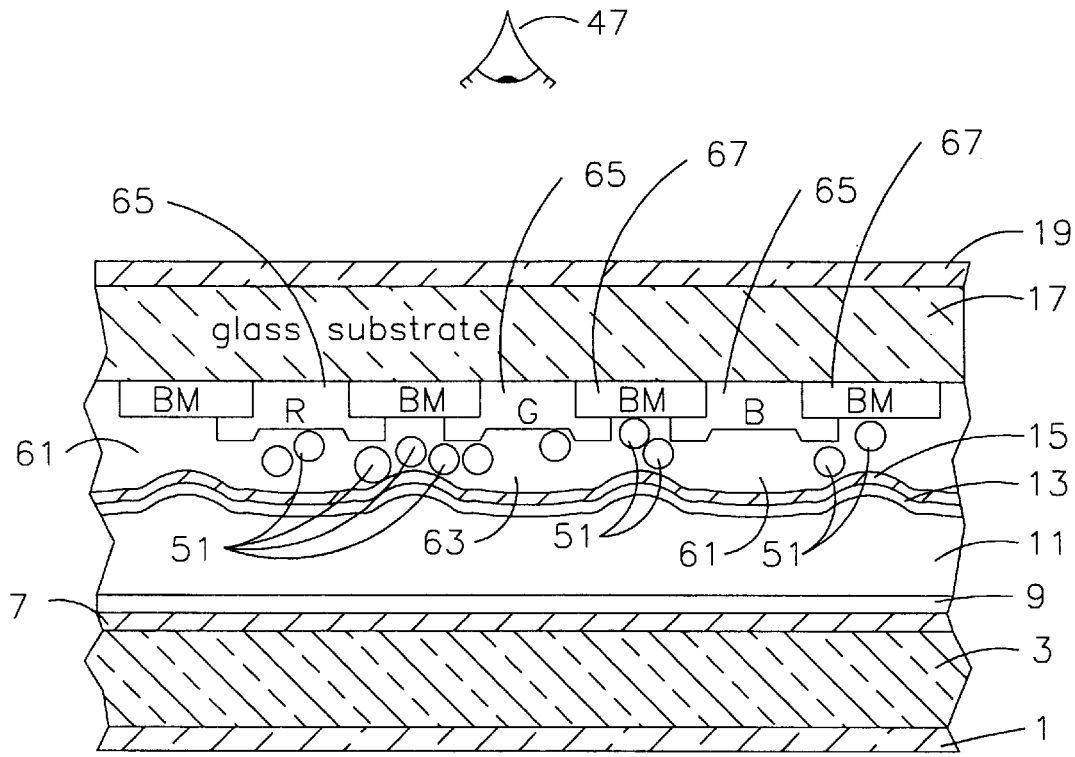
FIG. 7 is a side cross-sectional view of an LCD according to still another embodiment of this invention, where the diffusing layer is formed by way of a photoimageable substantially transparent host material having spacer beads disposed therein, and the diffusing layer is located between the front or passive substrate and the front pixel electrode layer.

FIG. 7 is a side cross-sectional view of a liquid crystal display according to yet another embodiment of this invention. In the FIG. 7 embodiment, color filters 65 do not act as diffusers. However, diffusing layer 61 is provided in between substantially transparent conductive common electrode 15 (e.g. ITO) and color filters 65. In this embodiment, diffusing layer 61 may include a photoimageable substantially transparent acrylic polymer host material 63 (e.g. Fuji Clear™), with spheres 51 being as discussed above. As illustrated, diffusing layer 61 in the FIG. 7 embodiment is also disposed between electrode(s) 15 and black matrix members 67. The $\Delta n$ value or difference between the refractive index $n_h$ of material 63 and that $n_p$ of the particles 51 is as discussed above, in all embodiments of this invention.

This invention will now be described with respect to an example, which is not intended to be limiting, of this invention. A simple prototype light valve was built. The host material 53, 63 was Fuji color filter (red), which is photoimageable, in a 25% solids concentration. A concentration of 25% by weight of Micro Pearl spacer beads was added to the Fuji host material, with the spacer beads representing spheres 51. The average diameter of each bead 51 was about 4 $\mu$m. This mixture was then spin-coated onto a glass substrate 17 and cured in an oven at about 220° C. for approximately 30 minutes.

Figure 9:
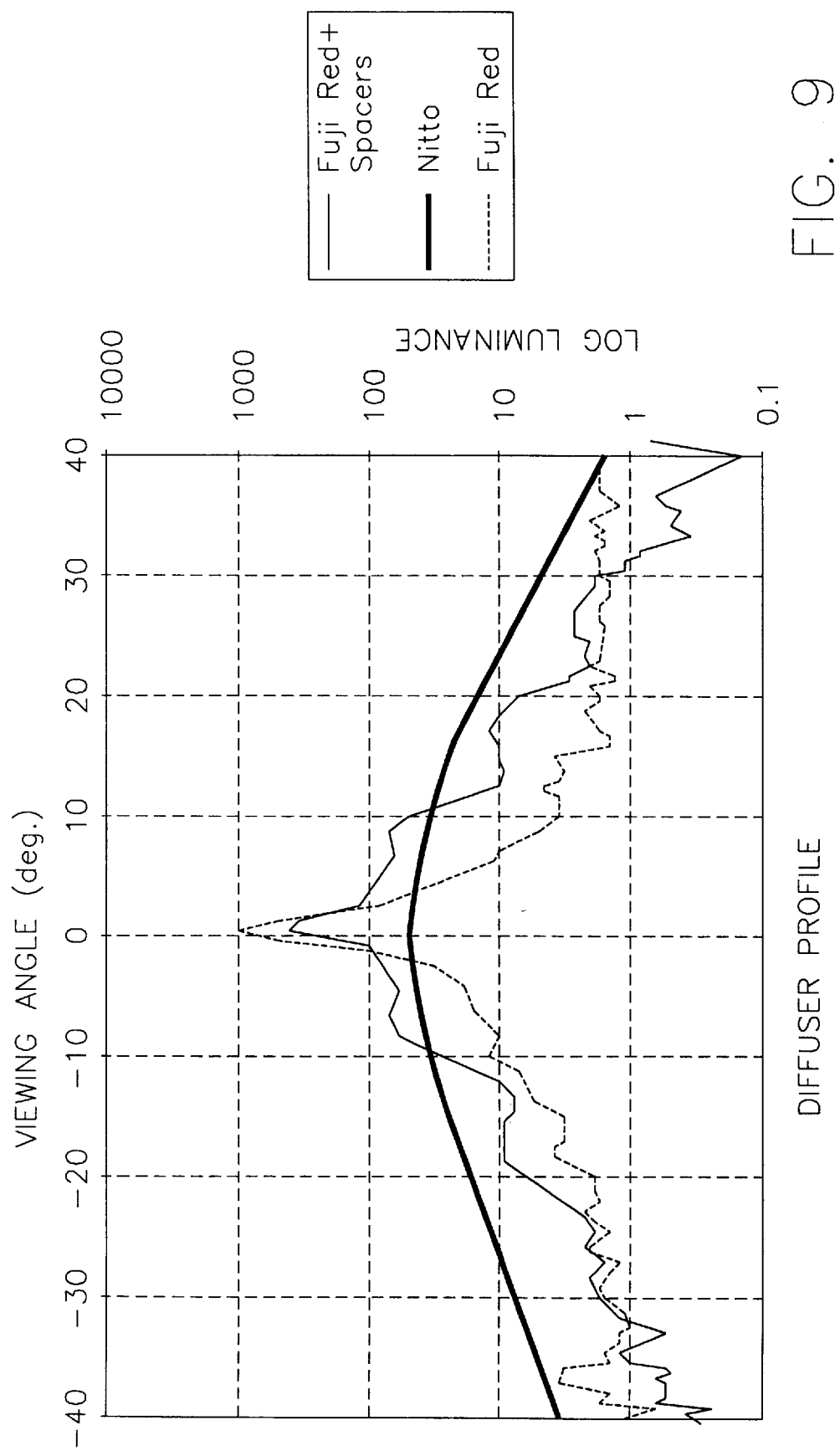
FIG. 9 is a plot of viewing angle versus luminance plotted on a log scale, this graph plotting a standard conventional Nitto diffuser versus a standard Fuji photoimageable red color filter versus a photoimageable red color filter having 4 $\mu$m diameter spacer beads therein.

FIG. 9 illustrates a plot of viewing angle versus luminants plotted on a log scale, for three different samples. One of these samples (including Fuji Red™ and spacers 51) was the exemplar sample described above including the spacers. Data was collected for FIG. 9 by shining an expanded and collimated laserbeam (632.8 nm) onto the three samples and measuring the output luminance as a function of angle with the Eldim type EZContrast system. The Eldim system is described, for example, in commonly owned U.S. Ser. No. 08/876,043, filed Jun. 13, 1997, the disclosure of which is hereby incorporated by reference. Three samples were measured in FIG. 9: (i) a standard Nitto diffuser, (ii) a standard Fuji Red™ color filter, and (iii) the Fuji Red™ color filter with 4 $\mu$m spacer beads described above. FIG. 10 is a plot of the same data as in FIG. 9, except that the luminance scale is plotted in a linear manner. FIG. 10 illustrates that a large normal incident component of the Fuji Red™ filter is diffused or spread into off normal angles by the Fuji Red™ color filter plus spherical bead layer designated in solid lines. As shown in FIGS. 9–10, the addition of spherical particles 51 to host material (e.g. Fuji Red™ polymer) increases the diffusing characteristic of the resulting material, as there is higher luminance over a broader range of angles. While, as shown in FIGS. 9–10, the Nitto roughened surface diffuser had the best diffusing capability, it is not photoimageable, not spin-coatable, cannot practically be positioned between a display's substrates, and has too high of a depolarizing effect.

The polarization maintaining properties of the Fuji Red™ plus spherical bead layer was tested and compared to the Nitto diffuser and Physical Optics Company holographic diffusers. The Fuji Red™ plus spherical bead diffusing layer (e.g. FIG. 5), according to this invention, maintained the input polarization much better than did the conventional diffusers. The polarization test was conducted as follows: (i) the transmitted luminance of parallel polarizers was measured (two opposing polarizers were provided with their respective linear transmission axes aligned parallel to one another); (ii) the transmitted luminance of cross polarizers was measured (axes of opposing polarizers perpendicular to one another as in a NW TN LCD); (iii) the contrast ratio of the polarizers in (i) and (ii) was calculated as a reference; and (iv) this procedure was repeated again with the Fuji Red™ 53 plus spherical beads 51 inserted between the polarizers. The contrast ratio of the standard linear polarizers alone was 3887:1. The contrast ratio of the polarizers with Fuji Red™ plus spherical beads therebetween was 1561:1 (i.e. the extinction ratio). The contrast or extinction ratio of the Nitto sample diffuser (conventional) in between the polarizers was less than 20:1.

In certain embodiments of this invention, it is preferable that this extinction ratio be at least about 1500:1, and is most preferably at least about 2000:1, for any diffusing layer herein so as to minimize depolarization effects.

The specular and diffuse reflectance of a standard Fuji Red™ color filter was measured and compared to that of a Fuji Red™ color filter with spherical beads according to this invention. The specular and diffuse reflectance of the standard Fuji Red™ color filter was, respectively, 0.46% and 0.32%. The specular and diffuse reflectance of the Fuji Red Color Mosaic™ color filter 53 plus beads according to this invention was, respectively, 0.15% and 0.61%. The measurement angle was 30°. In both cases, a piece of anti-reflection coated glass was index matched to the sample under test. These measurements indicate that the Fuji Red™ color filter plus beads according to this invention has much lower back-scattering than a conventional diffuser. Substantially collimated backlights are desirable in all transflective and transmissive embodiments herein.

FIGS. 11–12 illustrate measured display performance plots simulated in accordance with this invention. Significant improvements in gray scale linearity are shown. As illustrated, there is little gray scale inversion, and there is provided excellent separation of the gray scale voltages in the illustrated viewing zones. With regard to FIGS. 11–12, the display configuration used the Fuji Red™ color filter 53 plus beads 51 discussed above as a diffusing layer on the viewer side and between the polarizers. Again, the diffusing layer was spin-coated on, photopatternable, thin, and low in depolarizing effect, and thus can be internally coated between the polarizers and between the substrates.

FIG. 13 illustrates a white light contrast ratio plot, at a plurality of different viewing angles, of the device of FIGS. 11–12.

According to the FIG. 7 embodiment of this invention, AMLCDs may be made in the following manner. Firstly, active substantially transparent glass substrate 3 may be provided. An array of thin film transistors (TFTs) may be formed on substrate 3 as disclosed in U.S. Pat. No. 5,641,974, the disclosure of which is incorporated herein by reference. Thereafter, on substrate 3 a photoimageable insulating layer may be provided over top of the TFTs, with an array of discrete substantially transparent pixel electrodes 7 then being provided over the insulating layer, contacting corresponding TFTs through vias in the insulating layer, as disclosed and described in U.S. Pat. No. 5,641,974, the disclosure of which is incorporated herein by reference. A polyimide orientation film 9 may then be provided over top of the array of pixel electrodes on substrate 3. Passive substantially transparent glass substrate 17 is also provided. Anti-reflective black matrix portions 67 may be formed and patterned on substrate 17. Then, a layer of red color filter material may be deposited on substrate 17, and thereafter patterned (e.g. using a mask and ultraviolet exposure) so as to form an array of red color filters across substrate 17, with each red color filter to correspond with a red pixel. Then, a substantially continuous green color filter layer may be provided on substrate 17 over the black matrix portions and red color filter portions, and thereafter the green color filter layer being patterned so as to form an array of green color filters across substrate 17. An array of blue color filters is then formed across substrate 17 in a similar manner using photoimaging. Then, a diffuser layer 61, including a plurality of spherical particles 51 embedded in host material 63, may be spin-coated onto substrate 17 over top of the color filters 65 and black matrix portion 67. The diffusing layer may then be photoimaged using ultraviolet radiation so as to allow it to remain in a substantially continuous state across what is to be the viewing area of the display. In TFT display embodiments, a substantially transparent ITO layer is then deposited on substrate 17 over top of diffusing layer 61, with this ITO layer then being patterned about the edges so as to form common electrode 15. Thereafter, polyimide orientation film 13 is formed on substrate 17. It is noted that orientation films 9 and 13 may be formed in a conventional manner, or alternatively in a multi-domain manner. Liquid crystal layer 11 is then sandwiched between substrates 3 and 17 so as to result in the display illustrated in FIG. 7. Then, linear polarizer 1 is laminated or otherwise secured to substrate 3, while linear polarizer 19 is laminated or otherwise secured to active substrate 17.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A liquid crystal display comprising:
   first and second substantially transparent substrates;
   a liquid crystal layer disposed between said first and second substrates;
   a photo-imaged light diffuser layer disposed bewteen said liquid crystal layer and said second substrate, wherein said light diffuser layer includes a photo-imageable host material portion that is substantially transparent to at least one visible wavelength of light and a plurality of substantially spherical diffusing particles embedded in the host material portion; and
   the host material having a refractive index of $n_h$ and the diffusing particles having a refractive index of $n_p$, and wherein $\Delta n$ is greater than or equal to about 0.05, where $\Delta n = n_p - n_h$.

2. The display of claim 1 wherein refractive index $n_h$ of the host material is less than about 1.45 and refractive index $n_p$ of the particles is at least about 1.5.

3. The display of claim 2, wherein refractive index $n_p$ is from about 1.5 to 1.6, and wherein $\Delta n$ is from about 0.05 to 0.15.

4. The display of claim 1, wherein the host material is substantially transparent to all visible wavelengths of light.

5. The display of claim 1, wherein the host material is a color filter material and is substantially transparent to only select wavelengths of visible light.

6. The display of claim 1, wherein at least a substantial number of the particles are substantially spherical beads, and wherein the substantially spherical beads have an average diametric size of from about 3 to 8 $\mu$m.

7. The display of claim 1, further comprising color filters and a black matrix system disposed on said second substrate, and a backlight for illuminating the display.

8. The display of claim 7, wherein said diffuser layer is located between (i) said second substrate, and (ii) said black matrix system.

9. The display of claim 7, wherein said diffuser layer is located between (i) said liquid crystal layer, and (ii) said color filters and black matrix system.

10. The display of claim 7, wherein said diffuser layer and said color filters are one in the same.

11. The display of claim 1, wherein the diffuser layer has an extinction ratio of at least about 1500:1 so as to minimize depolarization effects.

12. The display of claim 11, wherein the diffuser layer has an extinction ratio of at least about 2000:1.

13. The display of claim 1, wherein the second substrate is a passive substrate and the first substrate is an active substrate including switching devices thereon, and wherein said second substrate is positioned between the first substrate and a viewer.

14. The display of claim 1, further comprising first and second linear polarizers sandwiching said substrates therebetween, and wherein said host material is photo-patternable.

15. A liquid crystal display comprising:

first and second substrates;

a liquid crystal layer disposed between said first and second substrates;

a photo light diffuser layer disposed between said liquid crystal layer and said second substrate, wherein said light diffuser layer includes a host material portion that is substantially transparent to visible wavelengths of light and a plurality of substantially spherical diffusing particles embedded in the host material portion, the particles being shaped so as to focus light in order to effect diffusing; and the host material having a refractive index of $n_h$ and the diffusing particles having a refractive index of $n_p$, and wherein $\Delta n$ is greater than or equal to about 0.05, where $\Delta n = n_p - n_h$.

* * * * *